US009542754B2

United States Patent
Endo

(10) Patent No.: US 9,542,754 B2
(45) Date of Patent: Jan. 10, 2017

(54) DEVICE AND METHOD FOR DETECTING MOVING OBJECTS

(71) Applicant: FUJIFILM Corporation, Tokyo (JP)

(72) Inventor: Hisashi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 121 days.

(21) Appl. No.: 14/167,651

(22) Filed: Jan. 29, 2014

(65) Prior Publication Data
US 2014/0146182 A1 May 29, 2014

Related U.S. Application Data

(63) Continuation of application No. PCT/JP2012/067547, filed on Jul. 10, 2012.

(30) Foreign Application Priority Data

Aug. 10, 2011 (JP) .................. 2011-175186

(51) Int. Cl.
*G06K 9/00* (2006.01)
*H04N 5/232* (2006.01)
*G06T 7/20* (2006.01)

(52) U.S. Cl.
CPC .............. *G06T 7/20* (2013.01); *G06K 9/00624* (2013.01); *G06T 7/2033* (2013.01); *G06T 7/2053* (2013.01); *H04N 5/23212* (2013.01); *H04N 5/23261* (2013.01); *G06T 2207/10016* (2013.01); *G06T 2207/10144* (2013.01);
(Continued)

(58) Field of Classification Search
CPC ........ G06T 7/20; G06T 7/2053; G06T 7/2033; G06T 2207/20212; G06T 2207/10144; G06T 2207/20201; G06T 2207/10016; G06K 9/00624; G06K 9/00; H04N 5/23212; H04N 5/23261; H04N 5/23254
USPC .............. 348/53, 56, 169, 207.99, 148, 699; 353/122; 382/103; 463/36; 701/26
See application file for complete search history.

(56) References Cited

U.S. PATENT DOCUMENTS

| 6,034,723 A | 3/2000 | Fujimori | |
|---|---|---|---|
| 2004/0101162 A1* | 5/2004 | Higaki | .................. G01C 11/00 382/103 |
| 2005/0041111 A1* | 2/2005 | Matsuoka | ................ 348/207.99 |

(Continued)

FOREIGN PATENT DOCUMENTS

| JP | 4-219080 A | 8/1992 |
|---|---|---|
| JP | 4-328689 A | 11/1992 |

(Continued)

*Primary Examiner* — Reza Aghevli
(74) *Attorney, Agent, or Firm* — Birch, Stewart, Kolasch & Birch, LLP

(57) ABSTRACT

A moving object detection apparatus comprising: an image acquisition device; a first moving object detection device; a difference image generation device; a second moving object detection device for detecting existence/nonexistence of the moving object based on the difference image generated by the difference image generation device; and an integration device for integrating a detection result by the first moving object detection device and a detection result by the second moving object detection device and determining that the moving object is detected in a case where the moving object is not detected by at least the first moving object detection device and the moving object is detected by the second moving object detection device.

16 Claims, 10 Drawing Sheets

(52) U.S. Cl.
CPC ............... *G06T 2207/20201* (2013.01); *G06T 2207/20212* (2013.01); *H04N 5/23254* (2013.01)

(56) References Cited

U.S. PATENT DOCUMENTS

| | | | |
|---|---|---|---|
| 2005/0074140 A1* | 4/2005 | Grasso | G06T 7/2033 382/103 |
| 2006/0244866 A1* | 11/2006 | Kishida | 348/699 |
| 2007/0035707 A1* | 2/2007 | Margulis | 353/122 |
| 2008/0131109 A1* | 6/2008 | Honjo | G03B 13/36 396/123 |
| 2008/0170122 A1* | 7/2008 | Hongo et al. | 348/148 |
| 2008/0260369 A1* | 10/2008 | Ibaraki | H04N 5/232 396/55 |
| 2008/0278584 A1* | 11/2008 | Shih | G06T 7/2006 348/169 |
| 2009/0167909 A1* | 7/2009 | Imagawa | G06T 3/4053 348/262 |
| 2009/0179995 A1* | 7/2009 | Fukumoto | H04N 5/23248 348/208.6 |
| 2010/0118156 A1* | 5/2010 | Saito | G06T 7/2006 348/208.6 |
| 2010/0208042 A1* | 8/2010 | Ikeda et al. | 348/53 |
| 2010/0235033 A1* | 9/2010 | Yamamoto et al. | 701/26 |
| 2010/0289883 A1* | 11/2010 | Goris et al. | 348/56 |
| 2010/0290671 A1* | 11/2010 | Shimizu | G06K 9/00771 382/103 |
| 2010/0290672 A1 | 11/2010 | Nishino et al. | |
| 2010/0295953 A1* | 11/2010 | Torii | G06T 5/003 348/208.4 |
| 2011/0044502 A1* | 2/2011 | Liu | G06T 7/2053 382/103 |
| 2011/0306420 A1* | 12/2011 | Nishimoto | A63F 13/06 463/36 |

FOREIGN PATENT DOCUMENTS

| | | | |
|---|---|---|---|
| JP | 5-183901 A | 7/1993 | |
| JP | 6-217188 A | 8/1994 | |
| JP | 8-69597 A | 3/1996 | |
| JP | 2001-092976 | * 4/2001 | ............... G06T 7/20 |
| JP | 2001-92976 A | 4/2001 | |
| JP | 2004-310595 A | 11/2004 | |
| JP | 2010-267055 A | 11/2010 | |

* cited by examiner

FIG.4
(A)
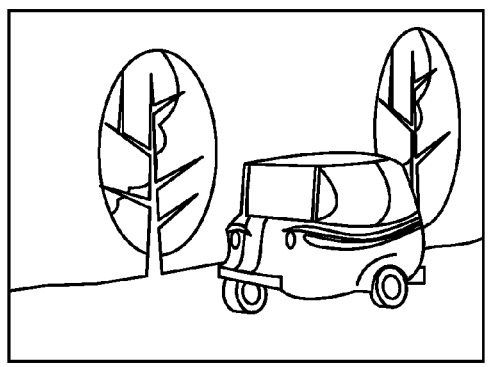
(B)
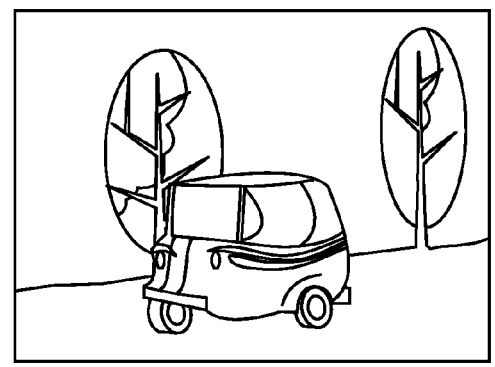
(C)
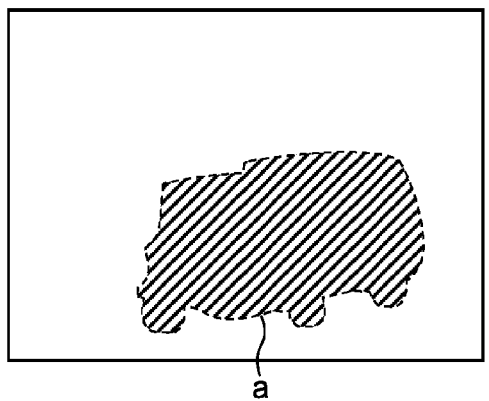
a

FIG.6

|  | | DETECTION RESULT BY INTER-FRAME DIFFERENCE | |
|---|---|---|---|
|  | | WITHOUT MOVING OBJECT | WITH MOVING OBJECT |
| DETECTION RESULT BY MOTION VECTOR | WITHOUT MOVING OBJECT | WITHOUT MOVING OBJECT | WITH MOVING OBJECT |
| | WITH MOVING OBJECT | WITH MOVING OBJECT | WITH MOVING OBJECT |

FIG.9
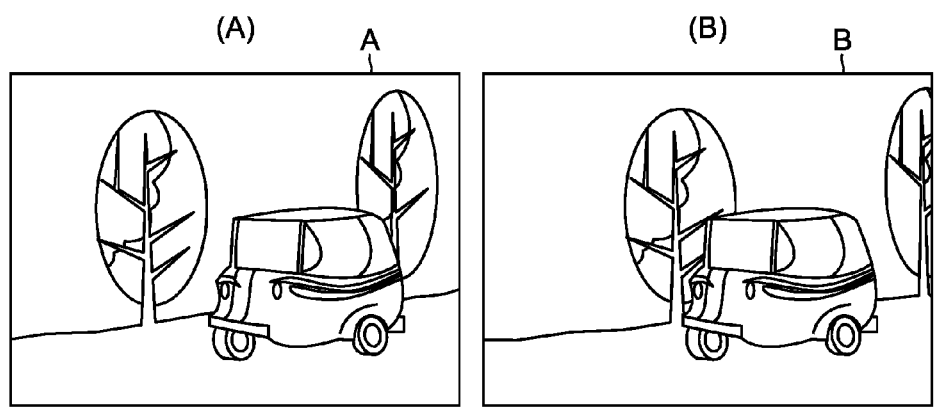
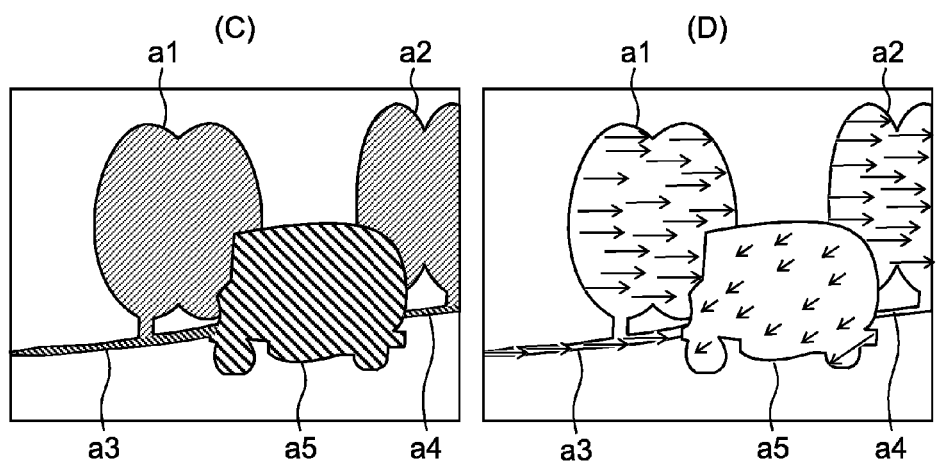

FIG.10
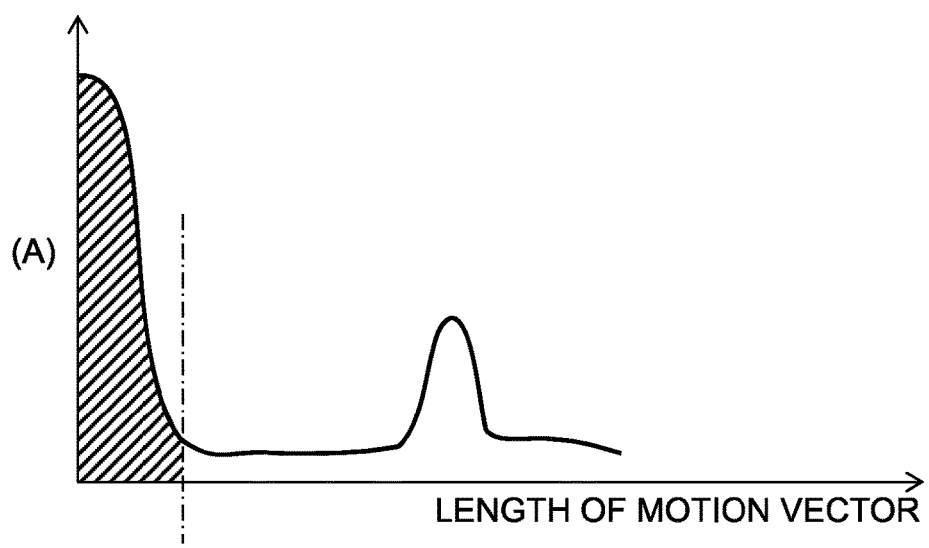
(A)
LENGTH OF MOTION VECTOR
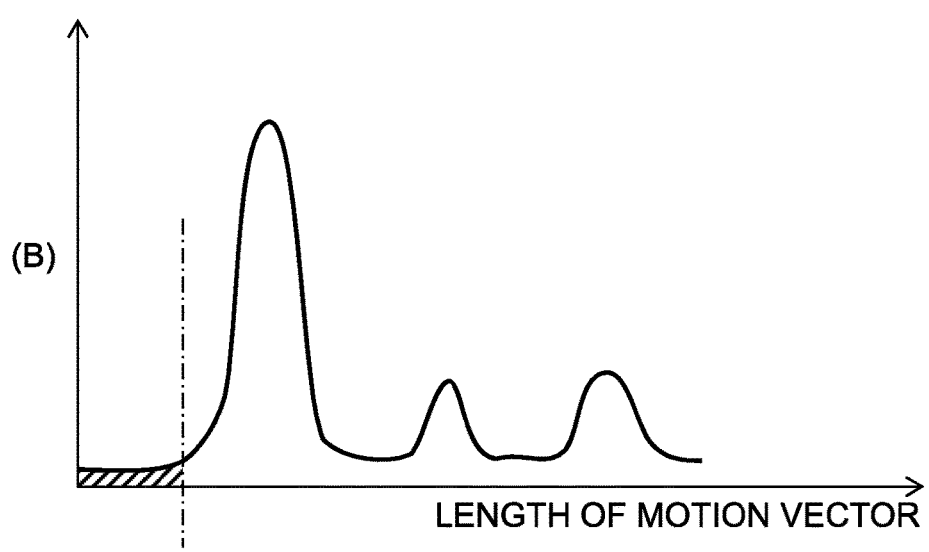
(B)
LENGTH OF MOTION VECTOR

DEVICE AND METHOD FOR DETECTING MOVING OBJECTS

CROSS REFERENCE TO RELATED APPLICATIONS

This application is a Continuation of PCT/JP2012/067547 filed on Jul. 10, 2012, which claims priority to Patent Application No. 2011-175186 filed in Japan on Aug. 10, 2011, all of which are hereby expressly incorporated by reference into the present application.

BACKGROUND OF THE INVENTION

Field of the Invention

The present invention relates to a moving object detection apparatus and method, and specifically relates to a technique that detects a moving object from frame images continuously taken.

Description of the Related Art

In the related art, there is suggested an image motion vector detection apparatus that performs moving object detection by detecting a camera-shake vector from an imaging signal acquired in a video camera and detecting an image motion vector which indicates the motion of an object and which can be distinguished from the camera-shake vector (PTL 1: Japanese Patent Application Laid-Open No. 6-217188).

Moreover, there is suggested a moving object monitoring apparatus that calculates an inter-frame difference from frame images taken by a television camera and detects a moving object from the inter-frame difference (PTL 2: Japanese Patent Application Laid-Open No. 5-183901). Especially, this moving object monitoring apparatus has a feature that: detects and removes images of moving objects that are not required to be monitored such as the swing of a tree branch that performs periodic motion in a limited range; and further determining whether the remaining images are moving objects of the monitoring targets such as a human and a vehicle, according to the size or the like of the screen position or the like.

SUMMARY OF THE INVENTION

However, in the invention described in PTL 1, since a moving object is detected on the basis of a motion vector, there is a problem that it is not possible to detect a moving object in an image due to an object blur in the case of a fast moving object, and, as a result, it is not possible to detect the motion vector (moving object). That is, in a case where the speed of the object is fast, since the object blur occurs, it is not possible to extract a feature point and corresponding point that are the starting point and ending point of the motion vector (it is not possible to detect the motion vector). Moreover, the calculation cost of the motion vector is high, and it is difficult to balance the real time performance and the elaborateness.

On the other hand, in the invention described in PTL 2, although a moving object is detected by an inter-frame difference and therefore the moving object can be excellently detected in the case of a fixed camera, there are problems that, in an unfixed camera, it is not possible to discriminate the camera motion and the moving object motion if position adjustment processing is not used together, and the detection accuracy is lower than the detection accuracy of the moving object by a motion vector (the elaborateness of detection).

The present invention is made in view of such conditions and it is an object to provide a moving object detection apparatus and method that can detect a moving object even if the moving object is fast, while maintaining the detection accuracy of a slow moving object.

To achieve this object, a moving object detection apparatus according to one aspect of the present invention includes: an image acquisition device for acquiring continuously taken images; a motion vector calculation device for calculating a motion vector showing a level and direction of movement of an object based on two images with different imaging times among the images acquired by the image acquisition device; a first moving object detection device for detecting existence/nonexistence of a moving object based on the motion vector calculated by the motion vector calculation device; a difference image generation device for generating a difference image between the two images with the different imaging times among the images acquired by the image acquisition device; a second moving object detection device for detecting existence/nonexistence of the moving object based on the difference image generated by the difference image generation device; and an integration device for integrating a detection result by the first moving object detection device and a detection result by the second moving object detection device and determining that the moving object is detected in a case where the moving object is not detected by at least the first moving object detection device and the moving object is detected by the second moving object detection device.

According to the moving object detection apparatus according to one aspect of the present invention, since moving object detection by a motion vector and moving object detection by a difference image between frames are used together and moving object detection is performed by integrating these detection results, it is possible to detect a fast moving object that cannot be subjected to the moving object detection by the motion vector while maintaining the detection accuracy of a slow moving object.

In the moving object detection apparatus according to another aspect of the present invention, when an object blur is caused in the two images by a fast moving object, the motion vector calculation device cannot calculate a motion vector with respect to the fast moving object, and the first moving object detection device determines that the moving object does not exist when the motion vector calculation device cannot calculate the motion vector.

In the moving object detection apparatus according to another aspect of the present invention, it is preferable that: the first moving object detection device continuously detects the existence/nonexistence of the moving object at a first time interval; the second moving object detection device continuously detects the existence/nonexistence of the moving object at a second time interval shorter than the first time interval; and the integration device integrates a latest detection result by the first moving object detection device and a latest detection result by the second moving object detection device.

That is, the moving object detection by the first moving object detection device and the moving object detection by the second moving object detection device are performed in parallel. At this time, the first time interval at which the first moving object detection device performs moving object detection is set longer than the second time interval at which the second moving object detection device performs moving object detection. This is because the processing data amount by the motion vector calculation device is greater than the processing data amount by the difference image generation device and requires much time to calculate a motion vector. Subsequently, the integration device integrates the latest detection result by the first moving object detection device and the latest detection result by the second moving object detection device. Although an object requiring the real time performance is a fast moving object, the real time performance can be secured by shortening the second time interval of the moving object detection by the second moving object detection device.

In the moving object detection apparatus according to another aspect of the present invention, it is preferable that the difference image generation device generates a difference image between reduction images acquired by reducing the two images. By this means, it is possible to intend the shortening of the processing time to generate the difference image, and enhance the responsiveness to a fast moving object.

In the moving object detection apparatus according to another aspect of the present invention, the motion vector calculation device includes a feature point extraction device for extracting a plurality of feature points from one image of the two images with the different imaging times and a corresponding point detection device for detecting a plurality of corresponding points that correspond to the plurality of feature points of the one image on the other image of the two images, and calculates motion vectors that connect the plurality of feature points of the one image and the corresponding points of the other image that correspond to the plurality of feature points. By this means, it is possible to detect a moving object (a region and motion vector of the moving object) accurately.

In the moving object detection apparatus according to another aspect of the present invention, when the moving object is detected by the first moving object detection device and the moving object is not detected by the second moving object detection device, the integration device determines that the moving object is detected. This is because, although there is a case where it is not possible to detect a slow moving object by the inter-frame difference image in the second moving object detection device, the first moving object detection device can detect the slow moving object accurately.

The moving object detection apparatus according to another aspect of the present invention may include an AF control unit configured to track the moving object and perform a focus adjustment operation of the image acquisition device when the integration device determines that the moving object is detected.

The moving object detection apparatus according to another aspect of the present invention may include a tracking unit configured to pan and/or tilt the moving object detection apparatus and track the moving object when the integration device determines that the moving object is detected.

The moving object detection apparatus according to another aspect of the present invention may include an imaging scene recognition unit configured to recognize an imaging scene based on the moving object when the integration device determines that the moving object is detected.

The moving object detection apparatus according to another aspect of the present invention includes: an image acquisition device for acquiring continuously taken images; a difference image generation device for generating a difference image between two images with different imaging times among the images acquired by the image acquisition device; a moving object candidate region extraction device for extracting a moving object candidate region based on the difference image generated by the difference image generation device; a motion vector calculation device for calculating a motion vector showing a level and direction of movement of an object based on the two images with the different imaging times among the images acquired by the image acquisition device; a panning determination device for determining whether the two images with the different imaging times are acquired by panning; and a moving object region determination device for determining whether the moving object candidate region extracted by the moving object candidate region extraction device is a moving object region, based on the motion vector calculated by the motion vector calculation device and a panning determination result by the panning determination device.

Whether time-series images are acquired at the time of panning or the time-series images are acquired at the time of non-panning is determined. Therefore, in a case where a moving object candidate region is extracted at the time of non-panning, the moving object candidate region can be determined to be a moving object region. Here, since the moving object candidate region is extracted by an inter-frame difference images, it is possible to extract even a fast moving object as a moving object candidate region, and, in the case of a slow moving object, it is possible to detect a moving object accurately by calculating a motion vector.

In the moving object detection apparatus according to another aspect of the present invention, when the panning is determined by the panning determination device, the moving object region determination device: determines the moving object candidate region is the moving object region when the motion vector does not exist in the moving object candidate region; determines the moving object candidate region is the moving object region when the motion vector exists in the moving object candidate region and a correlation with a peripheral motion vector is low; and does not determine the moving object candidate region is the moving object region when the motion vector exists in the moving object candidate region and the correlation with the peripheral motion vector is high.

In a case where the time-series images are acquired at the time of panning, since the moving object candidate regions extracted by the inter-frame difference image include the one originating in only panning and the one combining panning and the movement of the moving object, it is necessary to distinguish both of them. Further, at the time of distinguishing a certain moving object candidate region, in a case where there is no motion vector in the moving object region candidate (in a case where a motion vector is not calculated), it is regarded that the motion vector cannot be calculated due to a fast moving object, and the moving object region candidate is distinguished as a moving object region. Moreover, in a case where the motion vector exists in the moving object candidate region and a correlation with peripheral motion vectors is low, the moving object candidate region is determined to be a moving object region. On the other hand, in a case where the motion vector exists in the moving object candidate region and a correlation with peripheral motion vectors is high, it is regarded that the moving object candidate region is extracted by panning as a moving object candidate region, and it is not determined to be a moving object region. By this means, it is possible to specify the moving object region even at the time of panning In the moving object detection apparatus according to another aspect of the present invention, the moving object region determination device determines the moving object candidate region is the moving object region when the panning determination device determines that the panning is not provided.

In the moving object detection apparatus according to another aspect of the present invention, it is preferable that the panning determination device performs panning determination based on the motion vector calculated by the motion vector calculation device. This is because it is not necessary to separately use a sensor or the like to detect the panning.

In the moving object detection apparatus according to another aspect of the present invention, the panning determination device can determine that the panning is provided when a proportion or number of motion vectors with a motion vector length that is calculated by the motion vector calculation device and that is equal to or less than a certain level is less than a proportion or number set in advance, and determine that the panning is not provided when the proportion or number is greater than the proportion or number set in advance. At the time of non-panning, since the lengths of motion vectors in other parts than the moving object are equal to or less than a certain level, it is possible to determine non-panning or panning according to the proportion or number of motion vectors with a motion vector length equal to or less than the certain level.

The moving object detection apparatus according to another aspect of the present invention may include an AF control unit configured to track the moving object region and perform a focus adjustment operation of the image acquisition device when the moving object region determination device determines the moving object candidate region is the moving object region.

The moving object detection apparatus according to another aspect of the present invention may include a tracking unit configured to pan and/or tilt the moving object detection apparatus and track the moving object region when the moving object region determination device determines the moving object candidate region is the moving object region.

The moving object detection apparatus according to another aspect of the present invention may include an imaging scene recognition unit configured to recognize an imaging scene based on the moving object region when the moving object region determination device determines the moving object candidate region is the moving object region.

A moving object detection method according to another aspect of the present invention causes moving object detection apparatus to execute: an image acquisition step of acquiring continuously taken images; a motion vector calculation step of calculating a motion vector showing a level and direction of movement of an object based on two images with different imaging times among the acquired images; a first moving object detection step of detecting existence/nonexistence of a moving object based on the calculated motion vector; a difference image generation step of generating a difference image between the two images with the different imaging times among the acquired images; a second moving object detection step of detecting existence/nonexistence of the moving object based on the generated difference image; and an integration step of integrating a detection result by the first moving object detection step and a detection result by the second moving object detection step and determining that the moving object is detected in a case where the moving object is not detected by at least the first moving object detection step and the moving object is detected by the second moving object detection step.

In the moving object detection method according to another aspect of the present invention, when an object blur is caused in the two images by a fast moving object, the motion vector calculation step cannot calculate a motion vector with respect to the fast moving object, and the first moving object detection step determines that the moving object does not exist when the motion vector calculation step cannot calculate the motion vector.

In the moving object detection method according to another aspect of the present invention, it is preferable that: the first moving object detection step continuously detects the existence/nonexistence of the moving object at a first time interval; the second moving object detection step continuously detects the existence/nonexistence of the moving object at a second time interval shorter than the first time interval, in parallel with moving object detection by the first moving object detection step; and the integration step integrates a latest detection result by the first moving object detection step and a latest detection result by the second moving object detection step.

In the moving object detection method according to another aspect of the present invention, it is preferable that the difference image generation step reduces the two images and generates a difference image between the reduced reduction images.

In the moving object detection method according to another aspect of the present invention, the motion vector calculation step extracts a plurality of feature points from one image of the two images with the different imaging times, detects a plurality of corresponding points that correspond to the plurality of feature points of the one image on the other image of the two images, and calculates motion vectors that connect the plurality of feature points of the one image and the corresponding points of the other image that correspond to the plurality of feature points.

In the moving object detection method according to another aspect of the present invention, when the moving object is detected by the first moving object detection step and the moving object is not detected by the second moving object detection step, the integration step determines that the moving object is detected.

The moving object detection method according to another aspect of the present invention may execute an AF control step of tracking the moving object and performing a focus adjustment operation of the image acquisition step when the integration step determines that the moving object is detected.

The moving object detection method according to another aspect of the present invention may execute a tracking step of panning and/or tilting the moving object detection apparatus and tracking the moving object when the integration step determines that the moving object is detected.

The moving object detection method according to another aspect of the present invention may execute an imaging scene recognition step of recognizing an imaging scene based on the moving object when the integration step determines that the moving object is detected.

A moving object detection method according to another aspect of the present invention causes a moving object detection apparatus to execute: an image acquisition step of acquiring continuously taken images; a difference image generation step of generating a difference image between two images with different imaging times among the acquired images; a moving object candidate region extraction step of extracting a moving object candidate region based on the generated difference image; a motion vector calculation step of calculating a motion vector showing a level and direction of movement of an object based on the two images with the different imaging times among the acquired images; a panning determination step of determining whether the two images with the different imaging times are acquired by panning; and a moving object region determination step of determining whether the moving object candidate region extracted by the moving object candidate region extraction step is a moving object region, based on the motion vector calculated by the motion vector calculation step and a panning determination result by the panning determination step.

In the moving object detection method according to another aspect of the present invention, when the panning is determined by the panning determination step, the moving object region determination step: determines the moving object candidate region is the moving object region when the motion vector does not exist in the moving object candidate region; determines the moving object candidate region is the moving object region when the motion vector exists in the moving object candidate region and a correlation with a peripheral motion vector is low; and does not determine the moving object candidate region is the moving object region when the motion vector exists in the moving object candidate region and the correlation with the peripheral motion vector is high.

In the moving object detection method according to another aspect of the present invention, the moving object region determination step determines the moving object candidate region is the moving object region when the panning determination step determines that the panning is not provided.

In the moving object detection method according to another aspect of the present invention, it is preferable that the panning determination step performs panning determination based on the motion vector calculated by the motion vector calculation step.

In the moving object detection method according to another aspect of the present invention, the panning determination step determines that the panning is provided when a proportion or number of motion vectors with a motion vector length that is calculated by the motion vector calculation step and that is equal to or less than a certain level is less than a proportion or number set in advance, and determines that the panning is not provided when the proportion or number is greater than the proportion or number set in advance.

The moving object detection method according to another aspect of the present invention may execute an AF control step of tracking the moving object region and performing a focus adjustment operation of the image acquisition step when the moving object region determination step determines the moving object candidate region is the moving object region.

The moving object detection method according to another aspect of the present invention may execute a tracking step of panning and/or tilting the moving object detection apparatus and tracking the moving object region when the moving object region determination step determines the moving object candidate region is the moving object region.

The moving object detection method according to another aspect of the present invention may execute an imaging scene recognition step of recognizing an imaging scene based on the moving object region when the moving object region determination step determines the moving object candidate region is the moving object region.

According to the present invention, since moving object detection by a motion vector and moving object detection by a difference image between frames are used together and moving object detection is performed by integrating these detection results, it is possible to detect a fast moving object that cannot be subjected to the moving object detection by the motion vector while maintaining the detection accuracy of a slow moving object.

BRIEF DESCRIPTION OF THE DRAWINGS

FIG. 4 is a view illustrating two images at different imaging times and a difference image between these images.

FIG. 6 illustrates a table showing detection results that integrate detection results by a motion vector and detection results by an inter-frame difference.

FIG. 9 is a view illustrating two images at different imaging times and a difference image and motion vectors between these images.

FIG. 10 is a histogram of a motion vector used to describe one example of a panning determination method.

DETAILED DESCRIPTION OF THE PREFERRED EMBODIMENTS

In the following, embodiments of a moving object detection apparatus and method according to the present invention are described according to the accompanying drawings.

[Imaging Apparatus]

Figure 1:
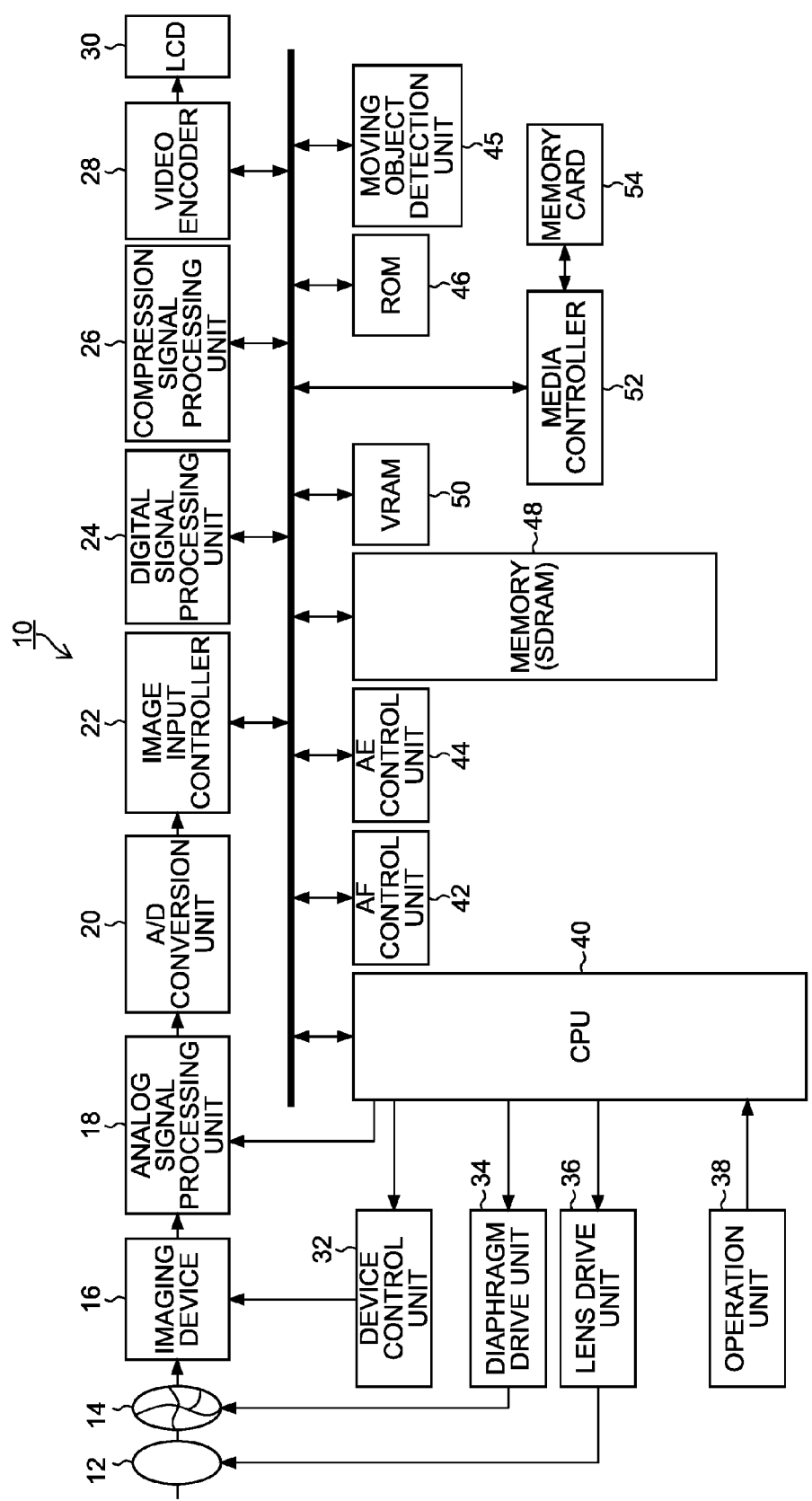
FIG. 1 is a block diagram showing an embodiment of an imaging apparatus to which a moving object detection apparatus according to the present invention is applied.

FIG. 1 is a block diagram showing an embodiment of an imaging apparatus to which a moving object detection apparatus according to the present invention is applied.

This imaging apparatus 10 denotes a digital camera that can take and record a still image or moving image and its equivalence (such as a camera phone, a smart phone and a camera PC), and the operation of the whole apparatus is integrally controlled by a central processing unit (CPU) 40.

The imaging apparatus 10 includes an operation unit 38 such as a shutter button, a mode dial, a playback button, a MENU/OK key, a cross key and a BACK key. A signal from this operation unit 38 is input in the CPU 40, and the CPU 40 controls each circuit of the imaging apparatus 10 on the basis of the input signal and, for example, performs lens drive control, diaphragm drive control, imaging operation control, image processing control, record/playback control of image data, moving object detection control according to the present invention or display control of a liquid crystal monitor 30, and so on.

The shutter button denotes an operation button to input an instruction of the start of imaging, and has a configuration of a two-step stroke type switch including an S1 switch turned on when being pressed halfway and an S2 switch turned on when being pressed fully. The mode dial denotes a selection device for selecting an auto imaging mode, a manual imaging mode, the scene position of a person, scene or night view, a macro mode or an animation mode, and so on.

The playback button denotes a button to switch to a playback mode that displays a still image or moving image which is taken and recorded on the liquid crystal monitor 30. The MENU/OK key denotes an operation key that has both a function as a menu button to give an instruction to display a menu on the screen of the liquid crystal monitor 30 and a function as an OK button that instructs settlement and execution of selection content. The cross key denotes an operation unit that inputs an instruction of four directions of up, down, right and left, and functions as a button (a cursor movement operation device) that instructs selection of various setting items from each menu. Here, the up/down key of the cross key functions as a zoom switch at the time of imaging or a playback zoom switch at the time of a playback mode, and the right/left key functions as a frame advance (forward-direction/backward-direction advance) button at the time of the playback mode. The BACK key is used when a desired target such as a selection item is removed, instruction content is cancelled or it returns to the previous operation state.

At the time of the imaging mode, image light showing an object is formed on the light receiving surface of an imaging device 16 (CMOS image sensor or CCD image sensor) through an imaging lens 12 and a diaphragm 14. The imaging lens 12 is driven by a lens drive unit 36 controlled by the CPU 40, and perform focus control or zoom control, and so on. For example, the diaphragm 14 is formed with five diaphragm blades, driven by a diaphragm drive unit 34 controlled by the CPU 40, and, for example, subjected to diaphragm control in seven stages at intervals of 1 AV from diaphragm value F1.4 to diaphragm value F11.

Moreover, the CPU 40 controls the diaphragm 14 by means of the diaphragm drive unit 34 and performs reading control of charge accumulation time (shutter speed) in the imaging device 16 or an image signal from the imaging device 16 through a device control unit 32.

The signal charge accumulated in the imaging device 16 is read out as a voltage signal corresponding to the signal charge on the basis of a read signal added from the device control unit 32. The voltage signal read out from the imaging device 16 is added to an analog signal processing unit 18, and the R, G and B signals of each pixel are sampling-held, amplified by gain (corresponding to ISO sensitivity) designated by the CPU 40 and subsequently added to an A/D converter 20. The A/D converter 20 converts the sequentially input R, G and B signals into digital R, G and B signals and output them to an image input controller 22.

A digital signal processing unit 24 performs predetermined signal processing such as offset processing, white balance correction, gain control processing including sensitivity correction, gamma correction processing, synchronization processing, YC processing and sharpness correction on the digital image signal input through the image input controller 22.

Further, in FIG. 1, "46" represents a ROM (EEPROM) to store a camera control program, defect information of the imaging device 16 and various parameters and tables used for image processing.

The image data processed in the digital signal processing unit 24 is output to a VRAM 50. The VRAM 50 includes region A and region B that store image data showing an image of one frame. The image data showing an image of one frame is alternately rewritten in region A and region B in the VRAM 50. The written image data is read out from a region different from a region in which the image data is rewritten, out of region A and region B in the VRAM 50. The image data read out from the VRAM 50 is encoded in a video encoder 28 and output to the liquid crystal monitor 30 provided on the back of the camera, and thereby an object image (live view image) is displayed on the display screen of the liquid crystal monitor 30.

Moreover, when the shutter button of the operation unit 38 is pressed on the first stage (half press), the imaging device 16 starts auto focus (AF) operation and AE (Automatic Exposure) operation and performs control such that the focus lens in the imaging lens 12 is adjusted to a focusing position by means of the lens drive unit 36. Moreover, when the shutter button is pressed halfway, the image data output from the A/D converter 20 is imported in an AE control unit 44.

In the AE control unit 44, G signals of the full screen are integrated or G signals subjected to different weighting in the center part and peripheral part of the screen are integrated, and the integrated value is output to the CPU 40. The CPU 40 calculates the brightness of the object (imaging EV value) from the integrated value input from the AE control unit 44, and, based on this imaging EV value, decides the diaphragm value of the diaphragm 14 and the electronic shutter (shutter speed) of the imaging device 16 according to a predetermined program diagram.

The CPU 40 controls the diaphragm 14 by means of the diaphragm drive unit 34 on the basis of the diaphragm value decided according to the program diagram, and controls the charge accumulation time in the imaging device 16 by means of the device control unit 32 on the basis of the decided shutter speed.

The AF control unit 42 denotes a part that performs contrast AF processing, and calculates an AF evaluation value indicating a focusing state by extracting the high frequency component of image data in a predetermined AF area of image data of one screen and integrating this high frequency component. The AF control is performed by controlling the imaging lens 12 such that this AF evaluation value becomes local maximum.

When the AE operation and the AF operation are finished and the shutter button is pressed on the second stage (full press), the image data output from the A/D converter 20 in response to the press is input in a memory (SDRAM) 48 from the image input controller 22 and temporarily stored.

The image data temporarily stored in a memory 48 is arbitrarily read out by the digital signal processing unit 24 and subjected to predetermined signal processing including synchronization processing (processing that interpolates a spatial gap of color signals according to the array of a primary color filter and converts the color signals in a synchronous system) and the YC processing (generation processing of luminance data and color difference data of the image data), and the image data (YC data) subjected to the YC processing is stored in the memory 48 again.

The YC data stored in the memory 48 is output to a compression/decompression processing unit 26, subjected to predetermined compression processing such as JPEG (joint photographic experts group) here and subsequently recorded in a memory card 54 by means of a media controller 52.

[Moving Object Detection]

A moving object detection unit 45 detects a moving object (moving object region) from time-series images (moving image) continuously taken at a predetermined frame rate (animation), and, for example, is applied to an automatic tracking AF that tracks a mobile object and performs AF operation. That is, when information showing the moving object region detected by the moving object detection unit 45 is added to the AF control unit 42, the AF control unit 42 performs AF processing using the moving object region as an AF area. By this means, when the object is focused on, afterwards, it is possible to automatically track the object and keep focusing on the object even if the object moves. It is possible to take an image without missing a shutter chance at the time of taking a still image and take a moving image focusing on a moving object at the time of taking the moving image.

Figure 2:
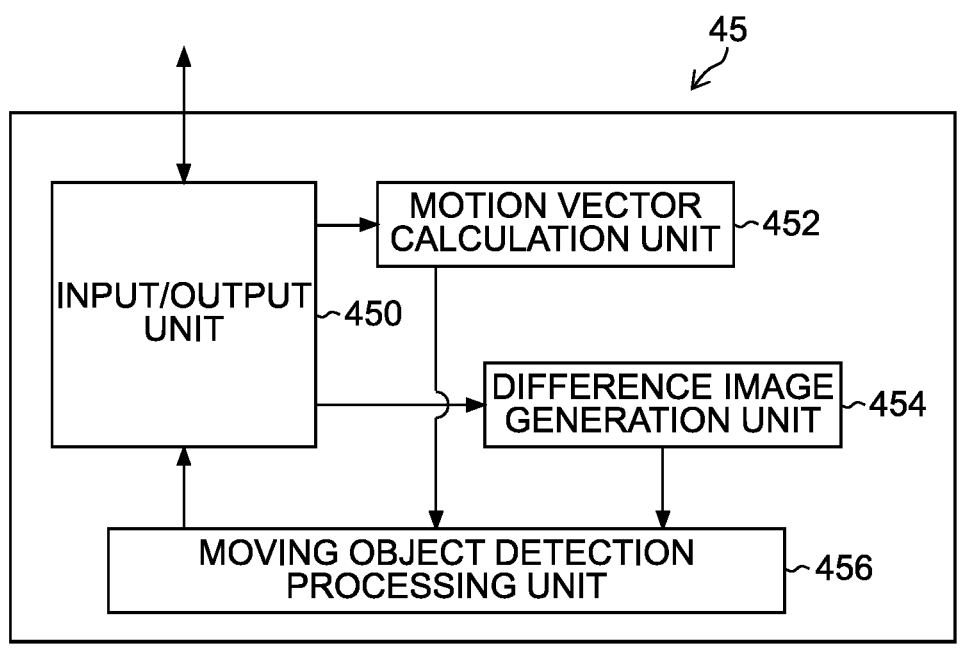
FIG. 2 is a block diagram showing an internal configuration of a moving object detection unit.

FIG. 2 is a block diagram showing an internal configuration example of the moving object detection unit 45. As illustrated in the figure, the moving object detection unit 45 includes an input/output unit 450, a motion vector calculation unit 452, a difference image generation unit 454 and a moving object detection processing unit 456.

The input/output unit 450 denotes a part that inputs the image data stored in the memory 48 by means of the image input controller 22 and outputs a moving object detection result, and so on. The motion vector calculation unit 452 acquires the image data at predetermined intervals through the input/output unit 450 and calculates a motion vector indicating the level and direction of the movement of the object on the basis of two pieces of image data (image pair) with different imaging times.

Figure 3:
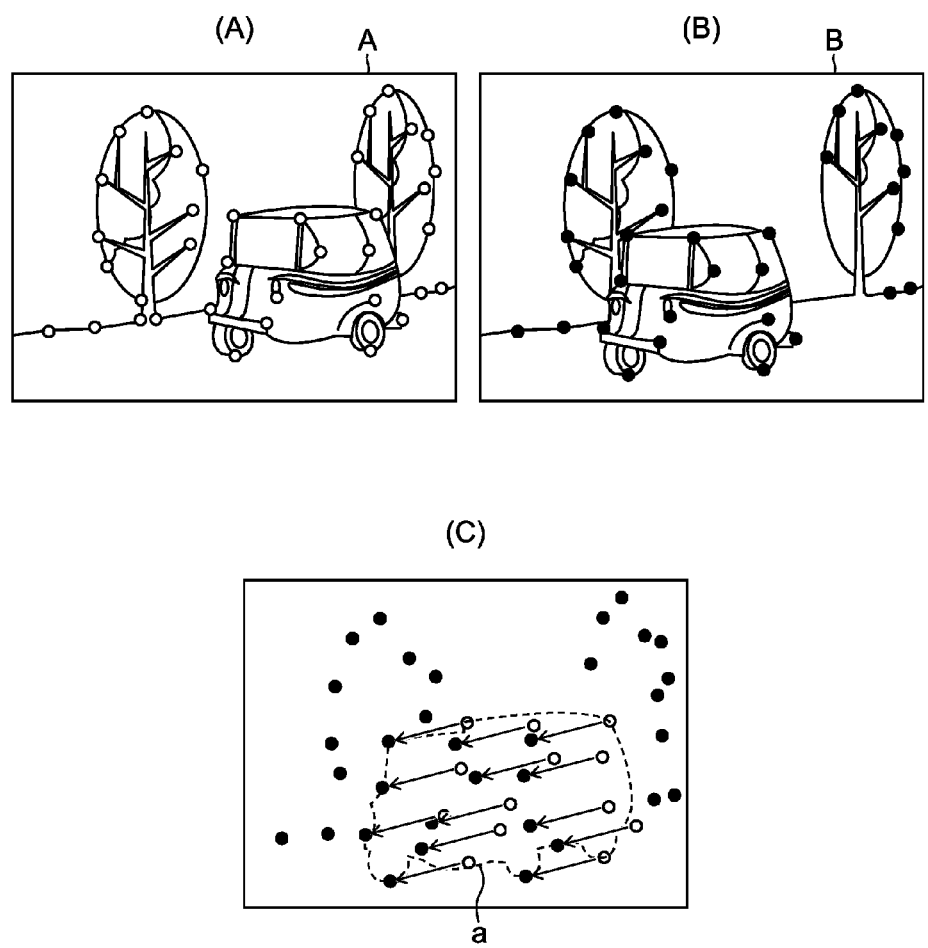
FIG. 3 is a view illustrating two images at different imaging times and motion vectors between these images.

Here, a calculation method of the motion vector is described using FIG. 3.

Part (A) and part (B) in FIG. 3 show one example of two images A and B with different imaging times. The imaging time of image A is earlier than image B, and these images A and B are images in a case where a moving object (car) moves only in the left direction.

In FIG. 3, image A with earlier imaging time out of two images A and B is assumed to be a reference image, and feature points (points shown with white circles on part (A) in FIG. 3) on this image A are extracted. The feature points denote points with a feature that they can be uniquely specified in image A, and they can specify points (corresponding points) having the same features as another image B.

Subsequently, the corresponding points (points shown with black circles on part (B) in FIG. 3) that correspond to the feature points extracted from image B are detected. Here, for example, a technique of Harris can be used as a detection method of the feature points, and it is possible to perform feature point tracking using, for example, the KLT method as a detection method of the corresponding points.

Further, as illustrated in in part (C) part in FIG. 3, motion vectors (arrows on part (C) in FIG. 3) that connect the feature points and the corresponding points are calculated on the basis of the coordinate values of the feature points and the corresponding points on the images.

The motion vectors calculated as above and the coordinate values of the starting points and ending points of the motion vectors are output to the moving object detection processing unit 456.

The moving object detection processing unit 456 extracts a region in which the motion vectors are equal, on the basis of the motion vectors and the coordinate values of the starting points and ending points of the motion vectors input from the motion vector calculation unit 452, and detects the region as moving object region C (region "a" shown with the dotted line on part (C) in FIG. 3). Here, the method described in PTL 1 may be used as a moving object detection method using the motion vectors.

Moreover, the difference image generation unit 454 acquires image data at predetermined intervals through the input/output unit 450 and generates a difference image that shows the difference between two pieces of image data (image pair) with different imaging times.

A difference image between two images A and B illustrated in parts (A) and (B) of FIG. 4 is illustrated in part (C) of FIG. 4. Here, two images A and B illustrated in parts (A) and (B) of FIG. 4 are the same as two images A and B illustrated in parts (A) and (B) of FIG. 3.

The difference image generated by the difference image generation unit 454 is output to the moving object detection processing unit 456. The moving object detection processing unit 456 detects a region in which the difference of the difference image input from the difference image generation unit 454 is large, as moving object region "a" (or a moving object candidate region). On part (C) of FIG. 4, a region (moving object region "a") in which the difference of the difference image is large is shown with diagonals.

The moving object detection processing unit 456 detects respective moving object regions on the basis of the motion vectors calculated by the motion vector calculation unit 452 and the difference image generated by the difference image generation unit 454 as described above, integrates these detection results and transmits it to the AF control unit 42 through the input/output unit 450.

Moreover, the moving object detection processing unit 456 determines panning by the motion vectors calculated by the motion vector calculation unit 452 and detects a moving object region on the basis of the determination result. Here, an integration method of the detection results of two kinds of moving object detection described above and a panning determination method are described later.

[First Embodiment]

Figure 5:
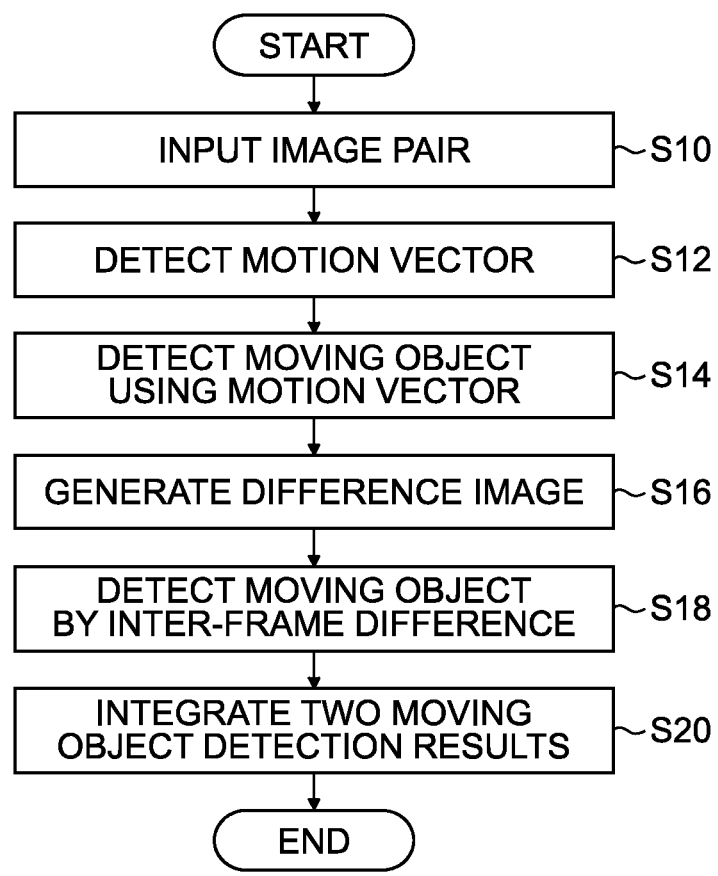
FIG. 5 is a flowchart illustrating the first embodiment of a moving object detection method according to the present invention.

FIG. 5 is a flowchart showing the first embodiment of a moving object detection method according to the present invention.

First, the input/output unit 450 of the moving object detection unit 45 illustrated in FIG. 2 inputs two images with different imaging times (image pair: adjacent frames are desirable) during imaging of a live view image or moving image (step S10). The motion vector calculation unit 452 calculates the motion vector of each feature point on the basis of detection of multiple feature points and corresponding points on the two input images (step S12). The moving object detection processing unit 456 detects a moving object (moving object region) on the basis of the calculated motion vectors (step S14).

Meanwhile, the difference image generation unit 454 generates a difference image from the image pair input in step S10 (step S16), and the moving object detection processing unit 456 detects a moving object (moving object region) by the generated difference image between frames (step S18).

The moving object detection processing unit 456 integrates the detection results of two kinds of moving object detection which are detected in above-mentioned steps S14 and S18, and outputs the integration result to the AF control unit 42 (step S20).

The processing in above-mentioned steps S10 to S20 is repeatedly performed during the imaging operation of the live view image or the moving image. By this means, as for a mobile moving object, information showing a region of the moving object is sequentially output to the AF control unit 42, and the AF control unit 42 can perform automatic tracking AF to track the mobile moving object and perform AF operation by using the moving object region input from the moving object detection unit 45 as an AF area.

Next, the integration processing of the detection results of two kinds of moving object detection in step S20 is described.

As illustrated in the table in FIG. 6, an integrated detection result is decided by combining the detection result by a motion vector and the detection result by an inter-frame difference. Basically, the detection result by the motion vector to be able to acquire an accurate result is used as it is. Here, in a case where both the detection result by the motion vector and the detection results by the inter-frame difference show "with moving object", the detection result by the motion vector is prioritized. This is because the moving object detection by the motion vector can specify a moving object region and calculate the amount of movement more accurately than the moving object detection by the inter-frame difference.

Moreover, in a case where the detection result by the motion vector shows "without moving object" and the detection by the inter-frame difference shows "with moving object", the integration result is set to "with moving object". This is because, in the case of the moving object detection by the motion vector and a fast moving object, since feature points cannot be extracted due to an object blur, the moving object detection cannot be performed and there is a possibility that it is detected as "without moving object", while it is possible to detect a fast moving object in the case of the moving object detection by the inter-frame difference.

On the other hand, in a case where the detection result by the motion vector shows "with moving object" and the detection result by the inter-frame difference shows "without moving object", the integration detection result is set to "with moving object". This is because, in the case of a slow moving object, it is possible to perform accurate detection in the moving object detection by the motion vector, while the detection accuracy is low in the object detection by the inter-frame difference and there is a possibility that it is detected as "without moving object".

According to the first embodiment described above, there is an advantage that it is possible to detect a moving object even in the case of a fast moving object while maintaining the detection accuracy of a slow moving object.

Moreover, it is possible to use the first embodiment in the case of determining a moving/non-moving object in each of a plurality of moving objet candidate regions extracted by some methods or in the case of determining whether there is a moving object in the entire screen.

[Second Embodiment]

Figure 7:
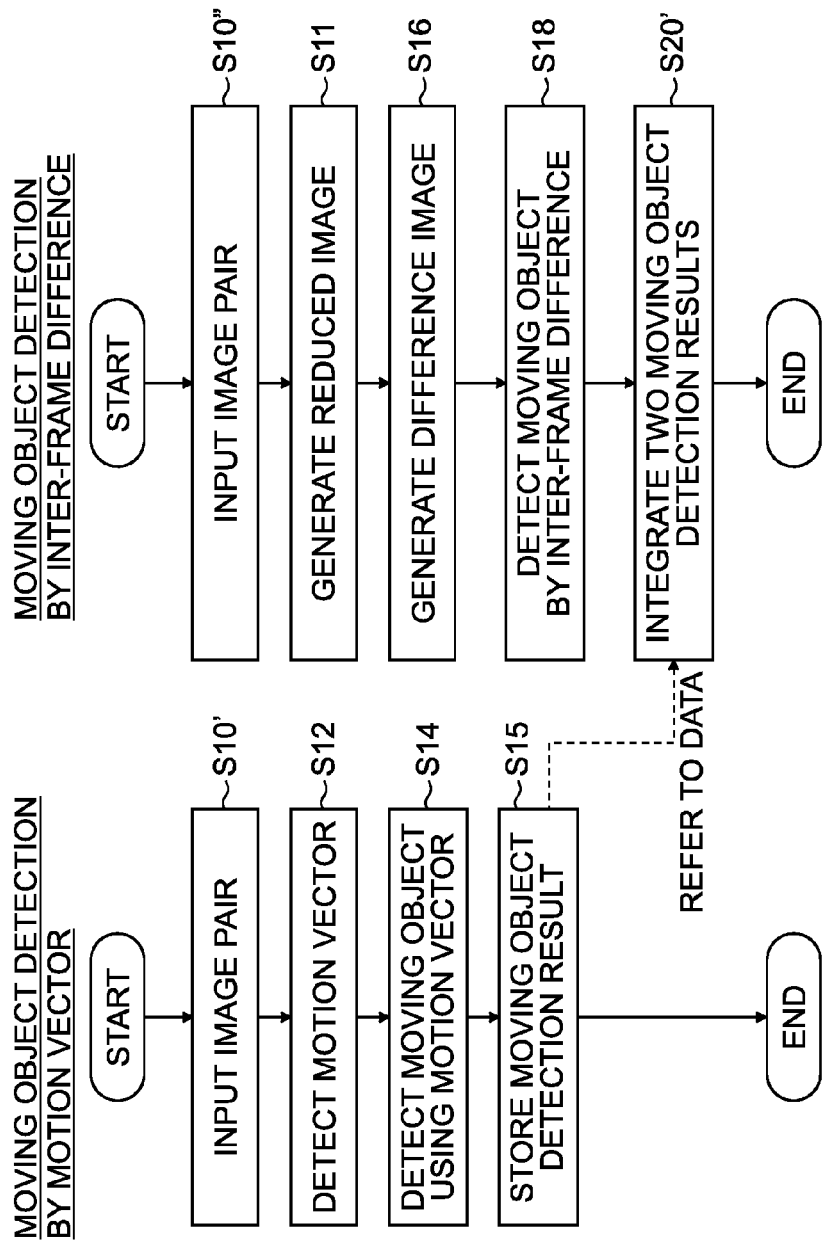
FIG. 7 is a flowchart showing the second embodiment of a moving object detection method according to the present invention.

FIG. 7 is a flowchart showing the second embodiment of a moving object detection method according to the present invention. Here, the same step numbers are attached to the common parts with the first embodiment illustrated in FIG. 5 and their detailed explanation is omitted.

As compared with the first embodiment, the second embodiment illustrated in FIG. 7 has main features that the moving object detection by the motion vector and the moving object detection by the inter-frame difference are processed in parallel and that the processing times of both moving object detection are different and the time of one moving object detection by the motion vector is longer than the time of one moving object detection by the inter-frame difference.

In general, the motion vector calculation has a high calculation cost and it is difficult to balance the real time performance and the elaborateness of the detection. For example, although it is possible to perform moving object detection more accurately by increasing the number of feature points (density) in the screen or raising the resolution of an input image, an increase of the processing data volume leads directly to the calculation time and has trade-off with the real time performance. In the case of imaging a moving object, the real time performance is important, and, if a detection response is delayed, there is a possibility that the moving object cannot be captured in the angle of view.

Although the second embodiment provides substantially the same processing as the first embodiment, the moving object detection by the motion vector and the moving object detection by the inter-frame difference are processed in parallel temporally and the moving object detection by the inter-frame difference is performed in a short period to secure the real time performance.

That is, in FIG. 7, although an image pair used for moving object detection in both steps S10' and S10", the input period of the image pair in step S10" is shorter than the input period of the image pair in step S10'.

Therefore, the moving object detection result by the motion vector detected on the basis of the image pair input in step S10' is temporarily stored (step S15).

On the other hand, the image pair input in step S10" is resized to a reduction image to shorten the processing time more (step S11), and, after that, a difference image is generated (step S16).

Since the position accuracy is originally low in the moving object detection by the inter-frame difference, the detection accuracy does not change greatly even if the reduction image is used. Meanwhile, as for a slow moving object targeted by the moving object detection by the motion vector, since it can be supported even if there is a detection interval in some degree, the calculation is implemented without reducing the detection accuracy.

In step S20', the moving object detection result by the motion vector stored in step S15 and the moving object detection result by the inter-frame difference in step S18 are integrated. At the time of integration, the latest detection results of two kinds are used. Here, the integration processing need not be necessarily provided in the processing flow of the moving object detection by the inter-frame difference.

According to the second embodiment described above, it is possible to enhance the detection responsiveness of a fast moving object while maintaining the calculation accuracy of a slow moving object.

[Third Embodiment]

Figure 8:
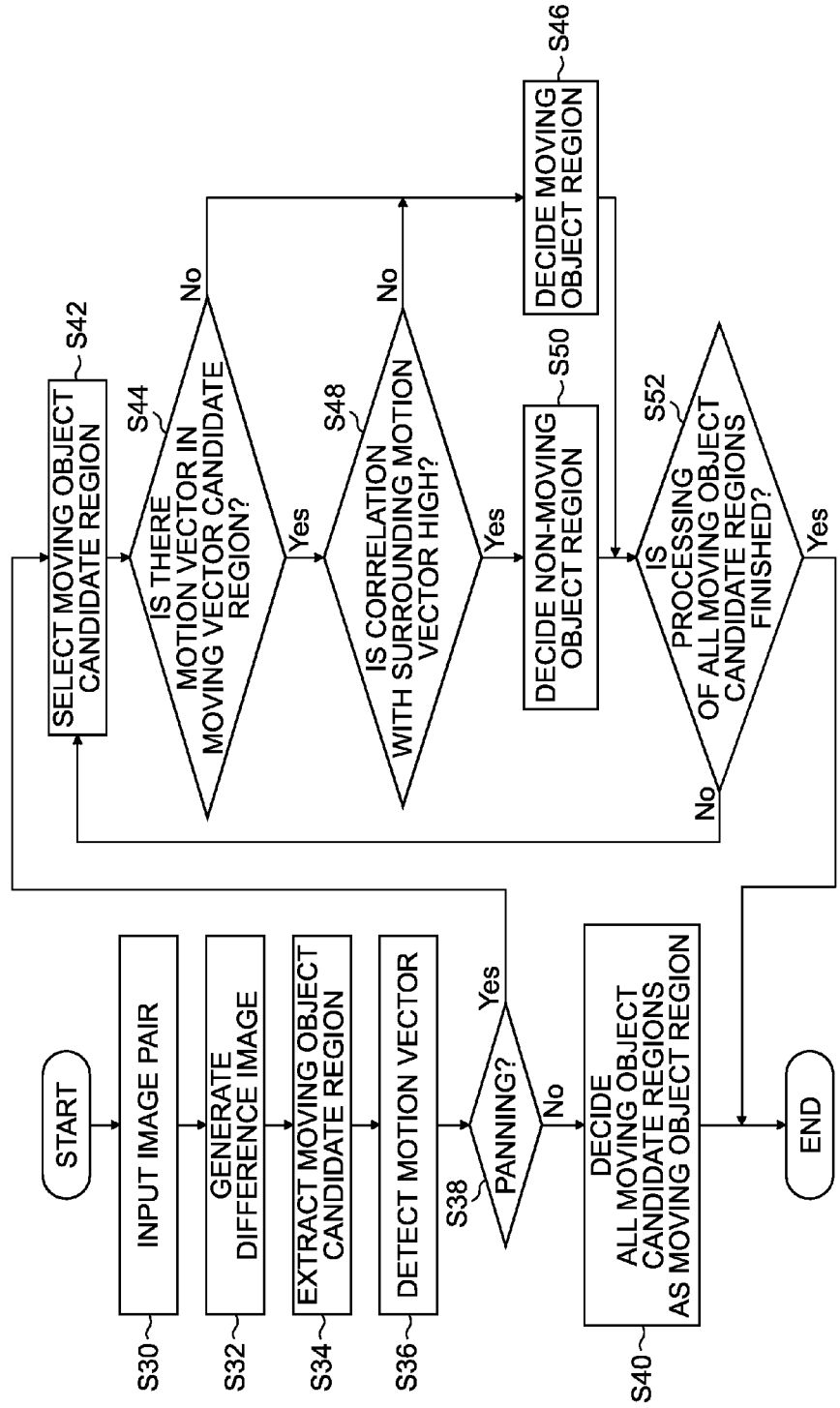
FIG. 8 is a flowchart showing the third embodiment of a moving object detection method according to the present invention.

FIG. 8 is a flowchart showing the third embodiment of a moving object detection method according to the present invention.

First, two images with different imaging times (image pair) are input during imaging of a live view image or moving image (step S30). The difference image generation unit 454 generates a difference image from the image pair input in step S30 (step S32), and the moving object detection processing unit 456 extracts a moving object candidate region by the generated difference image between frames (step S34).

Here, it is set as the moving object candidate region because, although the difference region is nearly equal to the moving object region in the case of a fixed camera, since there is a difference even by camera movement in the case of a non-fixed camera, there is a possibility that the difference region differs from the moving object region, and, in the case of panning, the difference region is caused even if the moving object is not present.

Parts (A) and (B) of FIG. 9 illustrate one example of two images A and B at different imaging times. Here, the imaging time of image A is earlier than that of image B, and these images A and B are images in a case where the imaging apparatus 10 performs panning in the right direction and the moving object (car) moves in the right direction.

Part (C) of FIG. 9 illustrates the difference image between two images A and B illustrated in parts (A) and (B) of FIG. 9. Based on this difference image between images A and B, moving object candidate regions a1, a2, a3, a4 and a5 illustrated in part (C) of FIG. 9 are extracted. That is, in regions with a large difference in the difference image, moving object candidate regions a1, a2, a3, a4 and a5 are extracted for each correlated region by the outline of the region or the color or brightness in the outline. Moreover, the plurality of moving object candidate regions a1, a2, a3, a4 and a5 may be distinguished according to the presence, level and direction of the motion vector calculated in next step S36.

Next, the motion vector calculation unit 452 calculates the motion vector of each feature point on the basis of the detection of multiple feature points and corresponding points on two input images (step S36). Part (D) of FIG. 9 illustrates the motion vectors of moving object candidate regions a1, a2, a3, a4 and a5.

Subsequently, it is determined whether the image pair was acquired during panning (panning determination) (step S38).

By the low resolution of the images used for the difference image by the inter-frame difference, although it is possible to absorb the image movement like camera shake by the difference image of the inter-frame difference of the camera shake or the like, it is not applicable to the case of moving the camera greatly like pan/tilt. Therefore, the panning determination is performed by the motion vector.

Although various methods are considered for the panning determination, the panning determination is performed on the basis of the motion vector detected in step S36 in the third embodiment.

To be more specific, a motion vector histogram corresponding to the length of the motion vector is created on the basis of the motion vector detected in step S36.

Parts (A) and (B) of FIG. 10 illustrate one example of a motion vector histogram in a case where panning is not provided and a motion vector histogram in a case where panning is provided.

In a case where panning is not provided, the frequency of motion vectors with a motion vector length of zero or nearly zero increases, while, in a case where panning is provided, the frequency of motion vectors with a motion vector length corresponding to the panning increases. Therefore, certain length L is set as a reference of the panning determination, it is determined that panning is not provided in a case where the proportion or number of motion vectors less than this length L is greater than a proportion or number set in advance (in the case of the histogram illustrated in part (A) of FIG. 10), and it is determined that panning is provided in a case where it is less than the proportion or number set in advance (in the case of the histogram illustrated in part (A) of FIG. 10).

In a case where it is determined in the panning determination in above-mentioned step S38 that the panning is not provided (in the case of "No"), since the difference region is nearly equal to the moving object region, all moving object candidate regions are decided as a moving object region (step S40). Here, at the time of deciding this moving object region, it is preferable to integrate two moving object detection results in the same way as the first embodiment.

On the other hand, in a case where it is determined in the panning determination in above-mentioned step S38 that the panning is provided (in the case of "Yes"), whether it is a moving object or it is a non-moving object is determined for each moving object candidate region. First, one moving object candidate region is selected from the moving candidate regions extracted in step S34 (step S42), and it is determined whether there is a motion vector in the selected moving object candidate region (step S44).

In a case where there is no motion vector (in the case of "No"), since there is a high possibility that it is not possible to extract feature points due to a fast moving object, the moving object candidate region is decided as a moving object region (step S46).

On the other hand, in a case where there is a motion vector (in the case of "Yes"), correlation with a motion vector in a peripheral moving object candidate region is checked (step S48). In a case where the correlation is low (in the case of "No"), the moving object candidate region is decided as a moving object region (step S46), and, in a case where the correction is high (in the case of "Yes"), it is decided that a motion vector is generated by the movement (panning) of the camera, and the moving object candidate region is not set as a moving object region (step S50).

For example, in the example illustrated in part (D) of FIG. 9, the motion vector of moving object candidate region a5 corresponding to the car (moving object) has a low correlation with the motion vectors of peripheral moving object candidate regions a1, a2, a3 and a4, and therefore it is determined as a moving object region. On the other hand, since there is a high correlation between the motion vectors of moving object candidate regions a1, a2, a3 and a4 corresponding to the background, they are determined as non-moving object regions.

Next, it is determined whether the determination processing of all moving object candidate regions is finished (step S52). In a case where it is not finished, it shifts to step S42 and the processing in steps S42 to S52 is repeated, and, in a case where it is finished, the moving object detection with respect to the image pair input in step S30 is finished.

According to the third embodiment, even in a case where a motion vector is generated by panning or a motion vector cannot be detected due to an object blur, it is possible to specify a moving object region of a mobile moving object.

Here, the moving object detection apparatus according to the present invention is applied to not only automatic tracking AF by a camera but also a mechanism that causes the camera body to perform pan/tilt operation and tracks the moving object, a monitoring camera that detects a moving object and recognition of an imaging scene object), and so on, and the use application is not limited to the present embodiment.

Moreover, it is needless to say that the present invention is not limited to the embodiments described above, and various changes are possible without departing from the spirit of the present invention.

What is claimed is:

1. A moving object detection apparatus comprising:
an image acquisition device that acquires continuously taken images; and
a processor and a non-transitory memory device storing instructions executed by the processor to:
calculate a motion vector of an object, the motion vector showing a level and direction of movement, the motion vector being calculated based on two images with different imaging times among the images acquired by the image acquisition device;
generate a difference image between two images with the different imaging times among the images acquired by the image acquisition device;

detect a first existence/nonexistence of a moving object based on the calculated motion vector;

detect a second existence/nonexistence of the moving object based on existence/nonexistence of a moving object region detected based on the generated difference image; and integrate the detected first existence/nonexistence of the moving object and the detected second existence/nonexistence of the moving object and determine that the moving object is detected, (a) in a case where the moving object is not detected by the first existence/nonexistence detecting step because the moving object is moving too fast for the motion vector calculating step to calculate the motion vector of the moving object and the moving object is detected by the second existence/nonexistence detecting step, and (b) in a case where the moving object is detected by the first existence/nonexistence detecting step and the moving object is not detected by the second existence/nonexistence detecting step because the moving object is moving too slow for the difference image generating step to generate the difference image.

2. The moving object detection apparatus according to claim 1, wherein:

the first existence/nonexistence detecting step determines that the moving object does not exist when the motion vector calculating step cannot calculate the motion vector due to an object blur caused in the two images by a fast moving object.

3. The moving object detection apparatus according to claim 1, wherein:

the first existence/nonexistence detecting step continuously detects the existence/nonexistence of the moving object at a first time interval;

the second existence/nonexistence detecting step continuously detects the existence/nonexistence of the moving object at a second time interval shorter than the first time interval; and the integrating step integrates a latest detection result by the first existence/nonexistence detecting step and a latest detection result by the second existence/nonexistence detecting step.

4. The moving object detection apparatus according to claim 1, wherein the difference image generating step generates a difference image between reduction images acquired by reducing the two images.

5. The moving object detection apparatus according to claim 1, wherein the motion vector calculating step extracts a plurality of feature points from one image of the two images with the different imaging times and detects a plurality of corresponding points that correspond to the plurality of feature points of the one image on the other image of the two images, and calculates motion vectors that connect the plurality of feature points of the one image and the corresponding points of the other image that correspond to the plurality of feature points.

6. The moving object detection apparatus according to claim 1, wherein:

the instructions stored in the non-transitory memory device further causes the processor to:

track the moving object and perform a focus adjustment operation of the image acquisition device when the integrating step determines that the moving object is detected.

7. The moving object detection apparatus according to claim 1, wherein:

the instructions stored in the non-transitory memory device further causes the processor to:

pan and/or tilt the moving object detection apparatus and track the moving object when the integrating step determines that the moving object is detected.

8. The moving object detection apparatus according to claim 1, wherein:

the instructions stored in the non-transitory memory device further causes the processor to:

recognize an imaging scene based on the moving object when the integrating step determines that the moving object is detected.

9. A moving object detection method that causes a moving object detection apparatus to execute:

an image acquisition step of acquiring continuously taken images;

a motion vector calculation step of calculating a motion vector of an object, the motion vector showing a level and direction of movement, the motion vector being calculated based on two images with different imaging times among the acquired images;

a first moving object detection processing step of detecting existence/nonexistence of a moving object based on the calculated motion vector;

a difference image generation step of generating a difference image between the two images with the different imaging times among the acquired images;

a second moving object detection processing step of detecting existence/nonexistence of the moving object based on existence/nonexistence of a moving object region detected based on the generated difference image; and an integration step of integrating a detection result by the first moving object detection processing step and a detection result by the second moving object detection processing step and determining that the moving object is detected, (a) in a case where the moving object is not detected by the first moving object detection processing step because the moving object is moving too fast for the motion vector calculation step to calculate the motion vector of the moving object and the moving object is detected by the second moving object detection processing step, and (b) in a case where the moving object is detected by the first moving object detection processing step and the moving object is not detected by the second moving object detection processing step because the moving object is moving too slow for the difference image generation step to generate the difference image.

10. The moving object detection method according to claim 9, wherein:

the first moving object detection processing step determines that the moving object does not exist when the motion vector calculation step cannot calculate the motion vector due to an object blur caused in the two images by a fast moving object.

11. The moving object detection method according to claim 9, wherein:

the first moving object detection processing step continuously detects the existence/nonexistence of the moving object at a first time interval;

the second moving object detection processing step continuously detects the existence/nonexistence of the moving object at a second time interval shorter than the first time interval, in parallel with moving object detection by the first moving object detection processing step; and the integration step integrates a latest detection result by the first moving object detection processing step and a latest detection result by the second moving object detection processing step.

12. The moving object detection method according to claim 9, wherein the difference image generation step reduces the two images and generates a difference image between the reduced reduction images.

13. The moving object detection method according to claim 9, wherein the motion vector calculation step extracts a plurality of feature points from one image of the two images with the different imaging times, detects a plurality of corresponding points that correspond to the plurality of feature points of the one image on the other image of the two images, and calculates motion vectors that connect the plurality of feature points of the one image and the corresponding points of the other image that correspond to the plurality of feature points.

14. The moving object detection method according to claim 9, further executing an AF control step of tracking the moving object and performing a focus adjustment operation of the image acquisition step when the integration step determines that the moving object is detected.

15. The moving object detection method according to claim 9, further executing a tracking step of panning and/or tilting the moving object detection apparatus and tracking the moving object when the integration step determines that the moving object is detected.

16. The moving object detection method according to claim 9, further executing an imaging scene recognition step of recognizing an imaging scene based on the moving object when the integration step determines that the moving object is detected.

* * * * *